Figure 1:
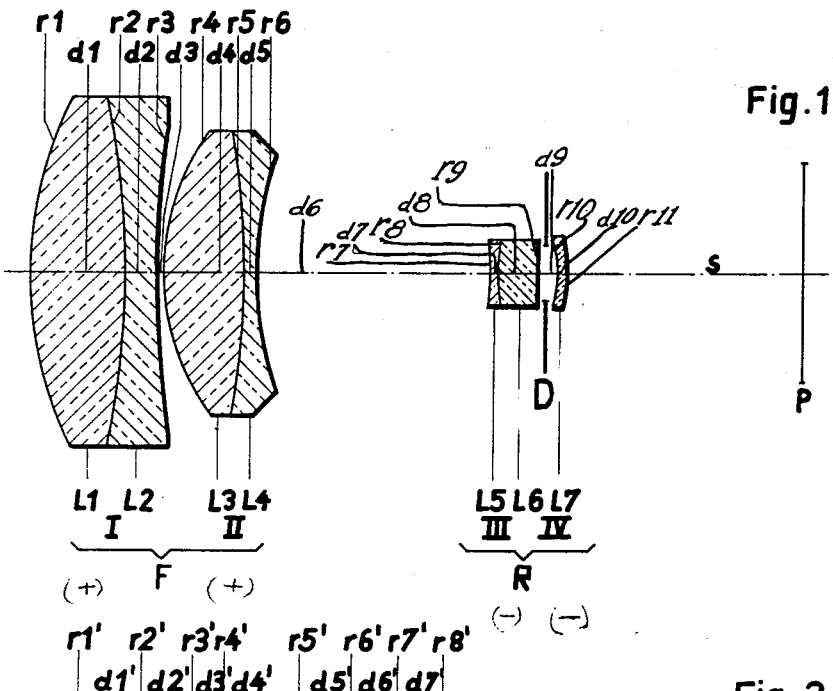

Dec. 22, 1964  W. ALBRECHT ETAL  3,162,714
TELEPHOTO OBJECTIVE
Filed Oct. 21, 1960

INVENTORS:
Wolfram Albrecht
BY Werner Wagner

AGENT.

3,162,714
TELEPHOTO OBJECTIVE

Wolfram Albrecht, Kreuznach, Rhineland, and Werner Wagner, Odernheim (Glan), Germany, assignors to Jos. Schneider & Co., Kreuznach, Rhineland, Germany, a corporation of Germany
Filed Oct. 21, 1960, Ser. No. 64,194
Claims priority, application Germany Oct. 22, 1959
9 Claims. (Cl. 88—57)

Our present invention relates to an optical objective of large focal length for photographic or cinematographic cameras.

Such objectives, known as telephoto objectives, are frequently used with cameras having a fixedly positioned shutter and, in such cases, are known to comprise a negative rear component forming a relatively small exit pupil directly ahead of the shutter, this rear component also including a diaphragm between two of its members, in combination with a positive front component which forms a relatively large entrance pupil for the incident longer light rays on the object side of the system and is separated from the rear component by a large air space.

It has heretofore been possible to realize with such telephoto objectives an overall focal length of approximately three times the diagonal of the projected image, this diagonal corresponding to the diameter of a circular area over which satisfactory definition is obtainable, with an image angle of about 12° and a relative aperture of 1:5.6. Further improvement could be achieved only with great difficulties because of the problem of placing the exit pupil and the diaphragm close enough to the shutter and the necessity of sufficiently restricting the field at the rear component in the vicinity of the shutter, especially where the structural requirements called for relatively large back-focal lengths of, say, 20 to 30% of the overall focal length of the objective.

Our invention has for its general object the provision of an improved telephoto objective in which the above difficulties are overcome.

More particularly, it is an object of this invention to provide a telephoto objective of larger relative aperture and increased focal length (preferably at least four times the image diagonal) without sacrificing the size of the image angle and the quality of projection heretofore obtainable.

A telephoto objective according to the invention comprises two air-spaced positive menisci in its front component, both of them turning their convex surfaces to the side of the longer light rays, i.e. the object side, and two air-spaced negative members in the rear component (of which preferably at least one is also a meniscus) each turning a concave surface toward the front component, the four members of the two components having individual focal lengths $f_I$, $f_{II}$, $f_{III}$, $f_{IV}$ related to the overall focal length $f$ of the system by the expression (a)  $1.5f > f_I > f_{II} > 0.8f$
(b)  $f > -f_{III} \geq -f_{IV} > 0.4f$ Inequality (a) indicates that the first two members are positively refracting and that their individual focal lengths range between $1.5f$ and $0.8f$; inequality (b) shows that the last two members are negatively refracting and that their focal lengths have absolute values ranging between $f$ and $0.4f$.

We have also found that the suppression of residual (particularly chromatic) aberrations is facilitated if the more forwardly positioned member of the rear component is a doublet with a cemented surface which turns its concavity toward the image side of the system. A further improvement in this respect is achieved if, in accordance with still another feature of the invention, the total axial length of the front component is greater than 0.8 times the air space separating the two components but is less than 25% of the overall focal length $f$. At the same time it is desirable that the radius of the convex forward surface of the first miniscus of the front component be greater than $0.3f$ but less than twice the radius of the corresponding surface of the second meniscus of that component.

Figure 2:
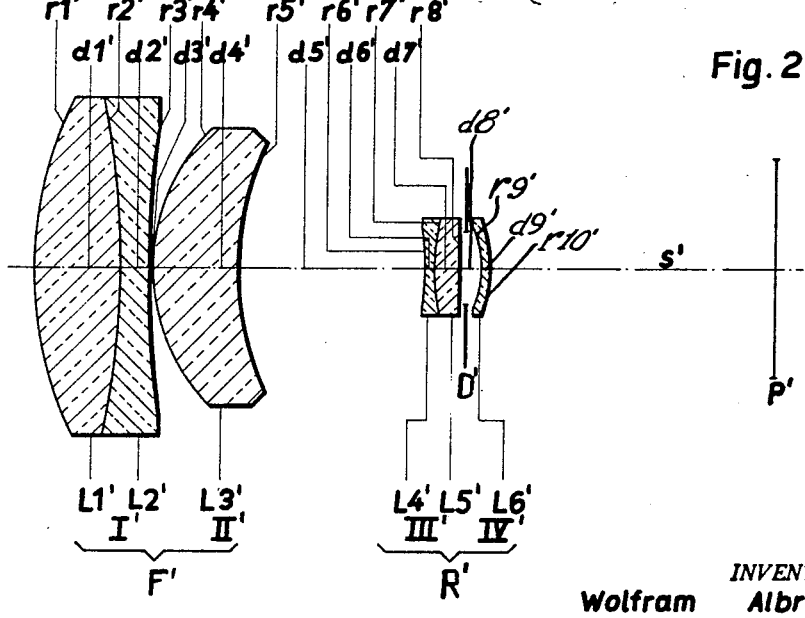

The invention will be described in greater detail with reference to the accompanying drawing in which:

FIG. 1 schematically illustrates an embodiment in which each of the menisci of the front component has a cemented surface; and FIG. 2 is a similar view of a modified system in which only the first meniscus is a doublet.

The system illustrated in FIG. 1 comprises a front component F, consisting of two positive menisci I and II, separated by a large air space $d_6$ from a rear component R of a negative doublet III and a negative singlet IV. The first member I is a doublet composed of a biconvex lens $L_1$, with radii $r_1$, $r_2$ and thickness $d_1$, cemented onto a biconcave lens $L_2$ with radii $r_2$, $r_3$ and thickness $d_2$. The second member II, separated from member I by an air space $d_3$ consists of a biconvex lens $L_3$ (radii $r_4$, $r_5$ and thickness $d_4$) cemented onto a biconcave lens $L_4$ (radii $r_5$, $r_6$, thickness $d_5$). The third member III is a negative meniscus composed of a biconcave lens $L_5$ (radii $r_7$, $r_8$ and thickness $d_7$) cemented onto a biconvex lens $L_6$ (radii $r_8$, $r_9$ and thickness $d_8$); separated from this member by an air space $d_9$, which includes a diaphragm D, is the fourth member IV consisting of a single negative meniscus $L_7$ with radii $r_{10}$, $r_{11}$ and thickness $d_{10}$. Lens $L_7$, which represents the exit pupil of the system, is separated by the back-focal length $s$ from the image plane P.

Representative values of the radii $r_1$ to $r_{11}$, the thicknesses and separations $d_1$ to $d_{10}$, the refractive indices $n_d$ and the Abbé numbers $\nu$ of the lenses $L_1$ to $L_7$ are given in the following Tables I and II, the values for $r_1$ to $r_{11}$ and $d_1$ to $d_{10}$ as well as $s$ being based upon a numerical value of 100 for the overall focus length of $f$ of the system.

Table I

[Relative aperture 1:4.5. $f=100$. $s=23.03$]

|   |   |   | Radii | Thicknesses and separations | $n_d$ | $\nu$ |
|---|---|---|---|---|---|---|
| F | I | L₁ | $r_1 = +36.32$ | $d_1 = 8.84$ | 1.56384 | 60.76 |
|   |   | L₂ | $r_2 = -78.05$ | $d_2 = 3.12$ | 1.67270 | 32.23 |
|   |   |    | $r_3 = +105.89$ | $d_3 = 0.26$ | air space |  |
|   | II | L₃ | $r_4 = +22.56$ | $d_4 = 7.54$ | 1.57444 | 56.43 |
|   |   | L₄ | $r_5 = -78.05$ | $d_5 = 1.04$ | 1.58144 | 40.80 |
|   |   |    | $r_6 = +34.70$ | $d_6 = 21.81$ | air space |  |
| R | III | L₅ | $r_7 = -31.22$ | $d_7 = 1.04$ | 1.62041 | 60.29 |
|   |   | L₆ | $r_8 = +21.08$ | $d_8 = 3.64$ | 1.56732 | 42.82 |
|   |   |    | $r_9 = -77.46$ | $d_9 = 2.00$ | diaphragm space |  |
|   | IV | L₇ | $r_{10} = -10.39$ | $d_{10} = 0.97$ | 1.56873 | 63.12 |
|   |   |    | $r_{11} = -15.79$ |   |   |   |

The individual focal lengths of the four members I, II, III and IV in the above system are as follows:

$f_I = 116.08$; $f_{II} = 91.16$; $f_{III} = -68.37$; $f_{IV} = -56.94$

The sum $\Sigma d_F$ of the axial thicknesses and spaces $d_1$ to $d_5$, i.e. the total axial length of the front component F, will be found to equal 20.80.

Table II

[Relative aperture 1:4.5. $f=100$. $s=23.33$]

|   |   |   | Radii | Thicknesses and separations | $n_d$ | $\nu$ |
|---|---|---|---|---|---|---|
| F | I | L₁ | $r_1 = +39.84$ | $d_1 = 9.71$ | 1.56384 | 60.76 |
|   |   | L₂ | $r_2 = -86.44$ | $d_2 = 3.43$ | 1.67270 | 32.23 |
|   |   |    | $r_3 = +116.95$ | $d_3 = 0.29$ | air space |  |
|   | II | L₃ | $r_4 = +24.78$ | $d_4 = 8.28$ | 1.57444 | 56.43 |
|   |   | L₄ | $r_5 = -86.44$ | $d_5 = 1.14$ | 1.58144 | 40.80 |
|   |   |    | $r_6 = +37.07$ | $d_6 = 23.95$ | air space |  |
| R | III | L₅ | $r_7 = -37.81$ | $d_7 = 1.14$ | 1.62041 | 60.29 |
|   |   | L₆ | $r_8 = +23.16$ | $d_8 = 4.00$ | 1.67270 | 32.23 |
|   |   |    | $r_9 = -306.19$ | $d_9 = 2.19$ | diaphragm space |  |
|   | IV | L₇ | $r_{10} = -10.78$ | $d_{10} = 1.07$ | 1.56873 | 63.12 |
|   |   |    | $r_{11} = -14.86$ |   |   |   |

The individual focal lengths of the four members I, II, III and IV in the above system are as follows:

$f_I = 126.55$; $f_{II} = 104.01$; $f_{III} = -84.97$; $f_{IV} = -76.02$

The sum $\Sigma d_F$ of the axial thicknesses and spaces $d_1$ to $d_5$ will be found to equal 22.85.

The system illustrated in FIG. 2 comprises a front component F', consisting of two positive menisci I' and II', separated by a large air space $d_5'$ from a rear component R' consisting of a negative doublet III' and a negative singlet IV'. The first member I' is a doublet similar to member I of FIG. 1. It is composed of a biconvex lens $L_1'$, with radii $r_1'$, $r_2'$ and thickness $d_1'$, cemented onto a biconcave lens $L_2'$ with radii $r_2'$, $r_3'$ and thickness $d_2'$. The second member II', separated from member I by an air space $d_3'$, consists of a single positive meniscus $L_3'$ having radii $r_4'$, $r_5'$ and thickness $d_4'$. The third member III' is again a negative meniscus composed of a biconcave lens $L_4'$ (radii $r_6'$, $r_7'$ and thickness $d_6'$) cemented onto a biconvex lens $L_5'$ (radii $r_7'$, $r_8'$ and thickness $d_7'$); separated from this member by an air space $d_8'$, which includes a diaphragm D', is the fourth member IV' consisting of a single negative meniscus $L_6'$ with radii $r_9'$, $r_{10}'$ and thickness $d_9'$. Lens $L_6'$ is separated by the back-focal length $s'$ from the image plan P'.

Representative values of the radii $r_1'$ to $r_{10}'$, the thicknesses and separations $d_1'$ to $d_9'$, the refractive indices $n_d$ and the Abbé numbers of the lenses $L_1'$ to $L_6'$ are given in the following Table III, the values for $r_1'$ to $r_{10}'$ and $d_1'$ to $d_9'$ as well as $s'$ being again based upon a numerical value of 100 for the overall focus length $f'$ of the system.

Table III

[Relative aperture 1:4.5. $f=100$. $s'=28.42$]

|   |   |   | Radii | Thicknesses and separations | $n_d$ | $\nu$ |
|---|---|---|---|---|---|---|
| F' | I' | L₁' | $r_1' = +35.89$ | $d_1' = 8.74$ | 1.48749 | 70.04 |
|   |   | L₂' | $r_2' = -7.44$ | $d_2' = 3.08$ | 1.67270 | 32.23 |
|   |   |    | $r_3' = +236.17$ | $d_3' = 0.26$ | air space |  |
|   | II' | L₃' | $r_4' = +19.09$ | $d_4' = 8.48$ | 1.48749 | 70.04 |
|   |   |    | $r_5' = +29.25$ | $d_5' = 18.98$ | air space |  |
| R' | III' | L₄' | $r_6' = -36.06$ | $d_6' = 1.03$ | 1.62041 | 60.29 |
|   |   | L₅' | $r_7' = +30.85$ | $d_7' = 2.70$ | 1.56873 | 63.12 |
|   |   |    | $r_8' = -77.14$ | $d_8' = 1.96$ | diaphragm space |  |
|   | IV' | L₆' | $r_9' = -9.60$ | $d_9' = 0.96$ | 1.56873 | 63.12 |
|   |   |    | $r_{10}' = -14.18$ |   |   |   |

The individual focal lengths of the four members I', II', III' and IV' in the above system are as follows:

$f_{I'} = 116.00$; $f_{II'} = 88.18$; $f_{III'} = -88.85$; $f_{IV'} = -56.36$

The sum $\Sigma d'_{F'}$ of the axial thicknesses and spaces $d_1'$ to $d_5'$, i.e. the total axial length of the front component F', will be found to equal 20.56.

It will be seen from the foregoing that each of the systems of Tables I, II and III satisfies the requirements of the expressions (a) $\quad\quad\quad 1.5f > f_I > f_{II} > 0.08f$ (b) $\quad\quad\quad f > -f_{III} \geq -f_{IV} > 0.04f$ as well as the conditions (c) $\quad\quad\quad 2r_4 > r_1 > 0.3f$ (or $2r_4' > r_1' > 0.3f'$)

and (d) $\quad\quad\quad 0.25f > \Sigma d_F > 0.8d_6$ (or $0.25f' > \Sigma d_{F'} > 0.8d_5'$)

which characterize the preferred system according to the invention.

We claim:

1. An optical telephoto objective system of overall focal length $f$, comprising four air-spaced lens members including a first, a second, a third and a fourth member of individual focal lengths $f_I$, $f_{II}$, $f_{III}$ and $f_{IV}$, respectively, said first and second members being in the shape of positive menisci and constituting a front component, said menisci turning their convex surfaces toward the object side of the system, said third and fourth members being negatively refracting and constituting a rear component separated from said front component by a large air space whose length is of the order of the total axial length of said first component but less than 1.25 times said total axial length, the latter being less than substantially 25% of said overall focal length, said third and fourth members each turning a concave outer surface toward said front component, the radius of the convex surface of said first member being less than twice the radius of the convex surface of the second member but greater than substantially 0.3 times said overall focal length, said overall focal length and said individual focal lengths satisfying the relationships $$1.5f > f_\text{I} > f_\text{II} > 0.08f \text{ and } f > -f_\text{III} \geqslant -f_\text{IV} > 0.4f$$

2. A system according to claim 1 wherein said third member and at least one member of said first component are doublets.

3. A system according to claim 1 wherein said third member is a doublet having a cemented surface turning its concavity towards the image side of the system.

4. A system according to claim 1 wherein said third member is a doublet having a cemented surface turning its concavity towards the image side of the system, the total axial length of said front component being greater than substantially 0.8 times the length of said large air space but less than substantially 25% of said overall focal length.

5. A system according to claim 4 wherein said first member consists of a first biconvex lens cemented onto a first biconcave lens, said second member consisting of a second biconvex lens cemented onto a second biconcave lens, said third member consisting of a third biconcave lens cemented onto a third biconvex lens, said fourth member being a meniscus-shaped singlet.

6. A system according to claim 5 wherein the radii $r_1$ to $r_{11}$ and the axial thicknesses and spacings $d_1$ to $d_{10}$ of said first biconvex lens $L_1$, said first biconcave lens $L_2$, said second biconvex lens $L_3$, said second biconcave lens $L_4$, said third biconcave lens $L_5$, said third biconvex lens $L_6$ and said singlet $L_7$, based upon a numerical value of 100 of said overall focal length $f$, their refractive indices $n_d$ and their Abbé numbers $\nu$ have numerical values substantially as given in the following table:

|  | Radii | Thicknesses and separations | $n_d$ | $\nu$ |
|---|---|---|---|---|
| $L_1$ | $r_1 = +36.32$ | $d_1 = 8.84$ | 1.56384 | 60.76 |
| $L_2$ | $r_2 = -78.05$ | $d_2 = 3.12$ | 1.67270 | 32.23 |
|  | $r_3 = +105.89$ | $d_3 = 0.26$ | air space |  |
| $L_3$ | $r_4 = +22.56$ | $d_4 = 7.54$ | 1.57444 | 56.43 |
| $L_4$ | $r_5 = -78.05$ | $d_5 = 1.04$ | 1.58144 | 40.80 |
|  | $r_6 = +34.70$ | $d_6 = 21.81$ | air space |  |
| $L_5$ | $r_7 = -31.22$ | $d_7 = 1.04$ | 1.62041 | 60.29 |
| $L_6$ | $r_8 = +21.08$ | $d_8 = 3.64$ | 1.56732 | 42.82 |
|  | $r_9 = -77.46$ | $d_9 = 2.00$ | diaphragm space |  |
| $L_7$ | $r_{10} = -10.39$ | $d_{10} = 0.97$ | 1.56873 | 63.12 |
|  | $r_{11} = -15.79$ |  |  |  |

7. A system according to claim 5 wherein the radii $r_1$ to $r_{11}$ and the axial thicknesses and spacings $d_1$ to $d_{10}$ of said first biconvex lens $L_1$, said first biconcave lens $L_2$, said second biconvex lens $L_3$, said second biconcave lens $L_4$, said third biconcave lens $L_5$, said third biconvex lens $L_6$ and said singlet $L_7$, based upon a numerical value of 100 for said overall focal length $f$, their refractive indices $n_d$ and their Abbé numbers $\nu$ have numerical values substantially as given in the following table:

|  | Radii | Thicknesses and separations | $n_d$ | $\nu$ |
|---|---|---|---|---|
| $L_1$ | $r_1 = +39.84$ | $d_1 = 9.71$ | 1.56384 | 60.76 |
| $L_2$ | $r_2 = -86.44$ | $d_2 = 3.43$ | 1.67270 | 32.23 |
|  | $r_3 = +116.95$ | $d_3 = 0.29$ | air space |  |
| $L_3$ | $r_4 = +24.78$ | $d_4 = 8.28$ | 1.57444 | 56.43 |
| $L_4$ | $r_5 = -86.44$ | $d_5 = 1.14$ | 1.58144 | 40.80 |
|  | $r_6 = +37.07$ | $d_6 = 23.95$ | air space |  |
| $L_5$ | $r_7 = -37.81$ | $d_7 = 1.14$ | 1.62041 | 60.29 |
| $L_6$ | $r_8 = +23.16$ | $d_8 = 4.00$ | 1.67270 | 32.23 |
|  | $r_9 = -306.19$ | $d_9 = 2.19$ | diaphragm space |  |
| $L_7$ | $r_{10} = -10.78$ | $d_{10} = 1.07$ | 1.56873 | 63.12 |
|  | $r_{11} = -14.86$ |  |  |  |

8. A system according to claim 4 wherein said first member consists of a first biconvex lens cemented onto a first biconcave lens, said second member consisting of a first meniscus-shaped singlet, said third member consisting of a second biconcave lens cemented onto a second biconvex lens, said fourth member being a second meniscus-shaped singlet.

9. A system according to claim 8 wherein the radii $r_1'$ to $r_{10}'$ and the axial thicknesses and spacings $d_1'$ to $d_9'$ of said first biconvex lens $L_1'$, said first biconcave lens $L_2'$, said first singlet $L_3'$, said second biconcave lens $L_4'$, said second biconvex lens $L_5'$ and said second singlet $L_6'$, based upon a numerical value of 100 for said overall focal length $f'$, their refractive indices $n_d$ and their Abbé numbers $\nu$ have numerical values substantially as given in the following table:

|  | Radii | Thicknesses and separations | $n_d$ | $\nu$ |
|---|---|---|---|---|
| $L_1'$ | $r_1' = +35.89$ | $d_1' = 8.74$ | 1.48749 | 70.04 |
| $L_2'$ | $r_2' = -7.44$ | $d_2' = 3.08$ | 1.67270 | 32.23 |
|  | $r_3' = +236.17$ | $d_3' = 0.26$ | air space |  |
| $L_3'$ | $r_4' = +19.09$ | $d_4' = 8.48$ | 1.48749 | 70.04 |
|  | $r_5' = +29.25$ | $d_5' = 18.98$ | air space |  |
| $L_4'$ | $r_6' = -36.06$ | $d_6' = 1.03$ | 1.62041 | 60.29 |
| $L_5'$ | $r_7' = +30.85$ | $d_7' = 2.70$ | 1.56873 | 63.12 |
|  | $r_8' = -77.14$ | $d_8' = 1.96$ | diaphragm space |  |
| $L_6'$ | $r_9' = -9.60$ | $d_9' = 0.96$ | 1.56873 | 63.12 |
|  | $r_{10}' = -14.18$ |  |  |  |

References Cited in the file of this patent

UNITED STATES PATENTS

| 2,441,093 | Aklin | May 4, 1948 |
| 2,541,485 | Shade et al. | Feb. 13, 1951 |
| 2,849,918 | Eismann et al. | Sept. 2, 1958 |
| 2,906,173 | Klempt | Sept. 29, 1959 |
| 3,033,081 | Baur et al. | May 8, 1962 |

FOREIGN PATENTS

| 1,034,564 | France | Apr. 15, 1953 |